United States Patent
Morais et al.

(10) Patent No.: US 7,676,840 B2
(45) Date of Patent: *Mar. 9, 2010

(54) USE OF HASHING IN A SECURE BOOT LOADER

(75) Inventors: Dinarte Morais, Redmond, WA (US); Jon Lange, Bellevue, WA (US); Daniel R. Simon, Redmond, WA (US); Ling Tony Chen, Bellevue, WA (US); Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

This patent is subject to a terminal disclaimer.

(21) Appl. No.: 11/030,825

(22) Filed: Jan. 7, 2005

(65) Prior Publication Data

US 2005/0138270 A1    Jun. 23, 2005

Related U.S. Application Data

(63) Continuation of application No. 10/165,519, filed on Jun. 7, 2002, now Pat. No. 6,907,522.

(51) Int. Cl.
G06F 11/00    (2006.01)

(52) U.S. Cl. .............................. 726/21; 711/102; 713/1; 713/2; 713/173

(58) Field of Classification Search .............. 713/1–2, 713/181, 173, 200, 193, 192; 711/102; 705/51, 705/57, 405; 380/48; 463/29; 726/21

See application file for complete search history.

(56) References Cited

U.S. PATENT DOCUMENTS

| | | | |
|---|---|---|---|
| 4,654,480 A * | 3/1987 | Weiss | 713/181 |
| 5,448,045 A * | 9/1995 | Clark | 235/382 |
| 5,643,086 A * | 7/1997 | Alcorn et al. | 463/29 |
| 5,919,257 A * | 7/1999 | Trostle | 726/22 |
| 6,081,890 A * | 6/2000 | Datta | 713/1 |
| 6,149,522 A * | 11/2000 | Alcorn et al. | 463/29 |
| 6,185,678 B1 * | 2/2001 | Arbaugh et al. | 713/2 |
| 6,263,431 B1 * | 7/2001 | Lovelace et al. | 713/2 |
| 6,401,208 B2 * | 6/2002 | Davis et al. | 713/193 |
| 6,625,730 B1 * | 9/2003 | Angelo et al. | 713/2 |
| 6,704,871 B1 * | 3/2004 | Kaplan et al. | 713/192 |
| 6,988,250 B1 * | 1/2006 | Proudler et al. | 716/1 |
| 2004/0064457 A1 * | 4/2004 | Zimmer et al. | 707/100 |

* cited by examiner

*Primary Examiner*—Carl Colin
*Assistant Examiner*—Hee Song
(74) *Attorney, Agent, or Firm*—Workman Nydegger

(57) ABSTRACT

Machine instructions comprising a bootstrap code are buried within a critical component of an electronic game console where they cannot readily be accessed or modified. A preloader portion in a read only memory (ROM) is hashed by the bootstrap code and the result is compared to an expected hash value maintained in the bootstrap code. Further verification of the boot-up process is carried out by the preloader, which hashes the code in ROM to obtain a hash value for the code. The result is verified against a digital signature value that defines an expected value for this hash. Failure to obtain any expected result terminates the boot-up process. Since the bootstrap code confirms the preloader, and the preloader confirms the remainder of the code in ROM, this technique is useful for ensuring that the code used for booting up the device has not been modified or replaced.

17 Claims, 3 Drawing Sheets

USE OF HASHING IN A SECURE BOOT LOADER

This application is a continuation of, and claims priority to, U.S. application Ser. No. 10/165,519, filed on Jun. 7, 2002 and entitled "USE OF HASHING IN A SECURE BOOT LOADER," now issued as U.S. Pat. No. 6,907,522 on Jun. 14, 2005.

FIELD OF THE INVENTION

The present invention generally relates to securely booting up an electronic device that includes a processor, and more specifically, pertains to ensuring that only desired machine instructions are executed by the processor when booting up such an electronic device, so as to prevent substitute or alternative machine instructions from being executed during the boot-up process.

BACKGROUND OF THE INVENTION

There are many types of electronic devices that must undergo a boot-up process when initially energized or reset. During the boot-up process, machine instructions controlling the basic operating characteristics of the electronic device are typically accessed where stored in read only memory (ROM) and executed to initialize the device and enable loading of further machine instructions into random access memory (RAM) that will be executed to enable the electronic device to implement still further functions. For example, when a personal computer is booted-up, instructions comprising a basic input-output system (BIOS) are executed that enable an operating system to be loaded into RAM from a hard drive and executed by the computer's central processing unit (CPU). The term "boot-up" is a short form of an earlier and perhaps more descriptive term "bootstrap."

Other types of electronic devices that must be booted-up include game consoles, digital recording devices, personal data systems, and almost any other electronic product that includes some form of processor that must execute a set of initial machine instructions to enable further functionality, as additional machine instructions are loaded into memory and executed. Because the boot-up process determines an initial state of an electronic device, it affects important operating parameters of the device and can have a substantial impact on how the electronic device is used after the boot-up process is completed. Preventing modification of the boot-up process can be important to a company that sold the electronic device, to avoid the loss of revenue arising from the use of the device.

For example, in the electronic gaming industry, much of the commercial value of game consoles sold to play electronic games derives from the licensing revenue generated by the game software that runs on the game consoles. Accordingly, the machine instructions that are loaded during the boot-up process implement functionality to prevent unlicensed copies of software from being run on the game consoles and enforces the manufacturer's policies relating to the use of the game consoles for playing electronic games. Certain users tend to view the restrictions on running unlicensed copies of software and the restrictions that enforce such policies on a game console as a challenge and an unwelcome limitation on the use of the game consoles. Such users work to overcome these restrictions by "hacking" the game console circuitry and software. For example, one way to avoid these restrictions is to cause the boot-up process running on a game console to load an altered software kernel in which certain changes have been made. These changes remove the restrictions imposed by the manufacturer of the game console, which can result in the loss of control by the manufacturer regarding how the game consoles are used, and can cause the loss of revenue, if unlicensed copies of software games are thereby enabled to run on the game console. Accordingly, it is common for a substantial effort to be undertaken by game console manufacturers to prevent a hacker from enabling an altered software kernel from being used during the boot-up process.

A similar problem exists in other areas of technology that employ electronic devices that must boot-up. For example, manufacturers of satellite television receivers that limit channels received based upon the monthly fee paid by users must ensure that their security policies and policies regarding use of their products are followed so that the consumer is only able to use the electronic device in accord with the terms of its license. A hacker might be able to modify the code that causes the processor in a satellite receiver to determine the television channels that the user has paid to view, thereby enabling all of the channels to be received and viewed without proper payment of the license fee to do so.

Accordingly, it would be desirable to ensure that only authorized software code is executed during a boot-up of an electronic device. Any technique that is used should prevent a modified or alternative set of machine instructions from being substituted for the authorized software that is intended to be executed during boot up of the device, and thus ensure that the electronic device implements the functionality and policies of the party that manufactured and/or distributed it to the end user. The known approaches used to prevent hackers from defeating the restrictions and policies regarding use of an electronic device, which are included in the code loaded at boot up of electronic devices, are apparently not fully successful. By using add-in circuit cards that include alternative software code, the known security approaches can at least partially be defeated by hackers who couple the circuit cards into the circuitry of the electronic device. Clearly, a more secure and rigorous approach is required to prevent an alternative code from being inserted and executed during the boot-up process of an electronic device.

SUMMARY OF THE INVENTION

The present invention should generally be applicable to almost any electronic device that includes a processor and must boot-up when initially energized or reset, to enable other functions of the electronic device to be carried out. In such a device, it will often be important to protect proprietary information that is employed during the operation of the device and to prevent unauthorized code from being executed during the boot-up process, to subvert policies related to the operation and application of the electronic device.

One of the components most likely to be replaced to subvert the desired policies and functionality of an electronic device is non-volatile memory in which machine instructions are stored that define how the electronic device is used. Accordingly, the present invention attempts to confirm that the code comprising the machine instructions in such memory is authorized (i.e., hasn't been modified or replaced with machine instructions that change the desired functionality and policies of the electronic device). In the present invention, the authorized code includes a predefined portion (also referred to as preloader code). This predefined portion must remain the same, even when changes are made to the remainder of the authorized code, or the electronic device will not boot-up.

A procedure is initially carried out to ensure that the predefined portion of the code is authorized. In this procedure, the predefined portion is hashed, producing a first hash value. The first hash value is then compared to a stored hash value that is maintained in a circuit component of the electronic device, separate from the memory where the code is stored, to verify that the predefined portion of the code is authorized. If the first hash value equals the stored hash value, execution of the predefined portion of the code is enabled, and if not, the boot-up of the electronic device is terminated. If the predefined portion of the code is enabled, substantially all of the code is hashed, to determine a second hash value. A digital signature is included in a different part of the code than the predefined portion of the code. The second hash value is then verified against the digital signature, to ensure the authenticity of the signature. If the digital signature is verified to be authentic, execution of the code is enabled, and if not, the boot-up of the electronic device is terminated.

To compare the first value to the stored hash value, an initial code that is maintained in a non-volatile storage portion of the circuit component is executed. This initial code includes the stored hash value and is maintained in a graphic processor, although, it is also contemplated that the stored hash value might be maintained in other types of auxiliary processors, such as an audio processor, an input processor, an output processor, a communication processor, or an digital signal processor. Indeed, it would be even more preferable to maintain the initial code and the expected hash value in a processor that executes the initial code. The initial code is executed to hash the predefined portion, and to carry out the comparison of the first hash value with the stored hash value. In a preferred form of the invention, the initial code is permanently defined in firmware as a predetermined number of bytes. In addition, the predefined portion of the code preferably comprises a predetermined number of bytes that are disposed at a predetermined location within the code. Clearly, unless the stored hash value is correspondingly changed, the size and content of the predefined portion of code cannot be modified, since the stored hash value would then not equal the first hash value.

The predefined code also includes a public key that is used for verifying the digital signature and has machine instructions that enable an encrypted kernel portion of the code to be decrypted. The decrypted kernel is then executed to complete the boot-up of the electronic device. The predefined code employs a streaming cipher to implement the decryption of the kernel portion of the code.

Another aspect of the present invention is directed to a memory medium on which is stored code comprising machine instructions that are accessed during the boot-up of an electronic device to determine whether the code is authorized. The memory medium includes the kernel portion, the boot loader portion, the preloader portion, and the digital signature, generally as discussed above.

Yet another aspect of the present invention is directed to an electronic device that must be booted-up to operate. The electronic device includes a non-volatile memory in which a plurality of machine instructions are stored. The non-volatile memory includes a main portion and a preloader portion having a predefined content, size, and location. A processor is coupled to the non-volatile memory to execute the machine instructions during the boot-up process. A bootstrap code firmware element specifies machine instructions defining a hashing algorithm and an expected hash value. The machine instructions of the bootstrap code firmware are executed by the processor initially during the boot-up of the electronic device, causing the processor to carry out the hashing of the preloader portion and comparison of the result to the expected hash value. Other details of the electronic device and its functionality are generally consistent with the steps of the method discussed above.

By employing the present invention in an electronic device, such as a game console, it will be apparent that an attempt to change machine instructions executed during the boot-up process or to substitute another memory with different machine instructions will prevent the device from successfully booting up. Accordingly, the present invention should generally prevent someone from modifying the basic functionality or avoiding desired policies that are to be implemented by the electronic device, by ensuring that only authorized code is executed during the boot-up of the electronic device.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System

It must be emphasized that the present invention is not intended to be limited to use only with a game console, although an initial preferred embodiment of the present invention is indeed used on a game console. This invention was developed to ensure that proprietary information is not disclosed to users who attempt to reverse engineer code, and to prevent users from avoiding licensing restrictions and policies relating to use of the game console for playing electronic games.

Figure 1:
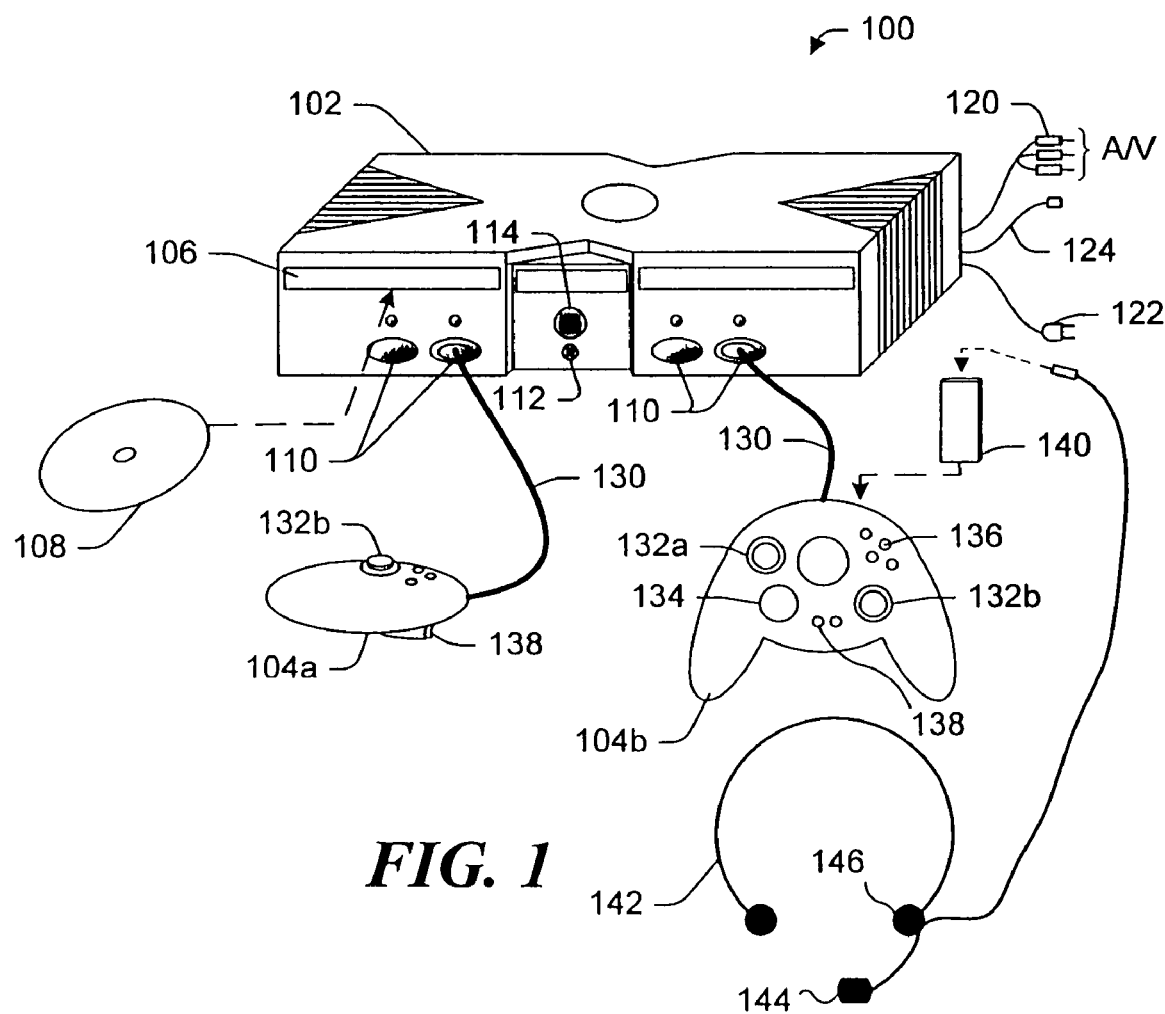
FIG. 1 is an isometric schematic view of a game console that employs the present invention.

As shown in FIG. 1, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media, include DVD discs and CD-ROM discs. In this gaming system, game programs are preferably distributed for use with the game console on DVD discs, but it is also contemplated that other storage media might instead be used on this or other types of systems that use the present invention to enforce data security policies and to ensure the authenticity of the digital data that are input to the system.

On a front face of game console 102 are four slots 110 for connection to and support of the controllers, although the number and arrangement of slots may be modified. A power button 112 and an eject button 114 are also positioned on the front face of game console 102. Power button 112 controls application of electrical power to the game console, and eject button 114 alternately opens and closes a tray (not shown) of portable media drive 106 to enable insertion and extraction of storage disc 108 so that the digital data on it can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data over a network such as the Internet, for example, via a conventional telephone modem, or more preferably, by a broadband connection.

Each controller 104*a* and 104*b* is coupled to game console 102 via a lead (or alternatively through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. Although all details of controller 104*a* are not shown in FIG. 1, each controller 104*a* and 104*b* is equipped with two thumbsticks 132*a* and 132*b*, a D-pad 134, buttons 136, and two triggers 138. These controllers are merely representative, and other known gaming input and control mechanisms may be substituted for or added to those shown in FIG. 1 for use with game console 102.

A removable or portable memory unit (MU) 140 can optionally be inserted into controller 104 to provide additional removable storage. Portable MUs enable users to store game parameters and port them for play on other consoles, by inserting the portable MUs into the other controllers. In the described implementation, each controller is configured to accommodate two MUs, although more or fewer than two MUs may instead be employed.

Gaming system 100 is capable of playing games, music, and videos. It is contemplated that other functions can be implemented using digital data stored on the hard disk drive or read from optical storage disc 108 in drive 106, from an online source, or from MU 140. The game console is designed to prevent unauthorized copies of electronic game discs from being played on the game console. Also, certain polices are enforced by the game console. For example, software sold in one geographic region may be precluded from executing on a game console that is sold in a different geographic region. Also, an industry standard scheme (MACROVISION™) for preventing copying of video DVDs is implemented by the game console software.

Certain users would prefer to defeat these functional limitation and policies that are implemented by the game console. One way to attempt to avoid these limitations and policies is by installing an integrated circuit (IC) or module in the game console that replaces the original ROM and code stored therein for use in booting-up the game console, with a modified version. The modifications to the machine instructions in such replacement modules are intended to operate during the boot-up process and eliminate or change the restrictions imposed by the manufacturer or designer of the game console that prevent use of unauthorized copies, the copying of video DVDs, and other functional aspects and/or policies of the game consoles. However, the present invention makes it extremely difficult to insert an unauthorized replacement ROM module to alter the boot-up process and terminates the boot-up process if it detects that an attempt has been made to employ alternative and unauthorized code during the boot-up of the game console.

In order to prevent proprietary information regarding the boot-up process from being discovered and to prevent modified or alternative code from being employed during the boot-up process, at least some portion of the machine instructions that are executed during boot-up must be kept separate from the majority of the machine instructions that are included within the ROM of the game console or other electronic device. Generally, ICs, traces, connection points, and vias on a printed circuit board of an electronic device are readily accessible if the housing of the electronic device is opened, enabling new connections and modifications to be physically made to hack the device. Although it is difficult to prevent someone from accessing the printed circuit board, the present invention makes it very difficult to access machine instructions that are embedded as firmware within one of the ICs mounted on the printed circuit board. Preferably, an IC should be used for this purpose that is not readily available to the public from its supplier, since it is custom made for the manufacturer of the electronic device. Also, the IC used for this purpose should be essential to the operation of the electronic device, so that if an attempt is made to access the firmware embedded in the IC, it is very likely that the operation of the IC, and thus, the operation of the electronic device will be adversely affected.

Figure 2A:
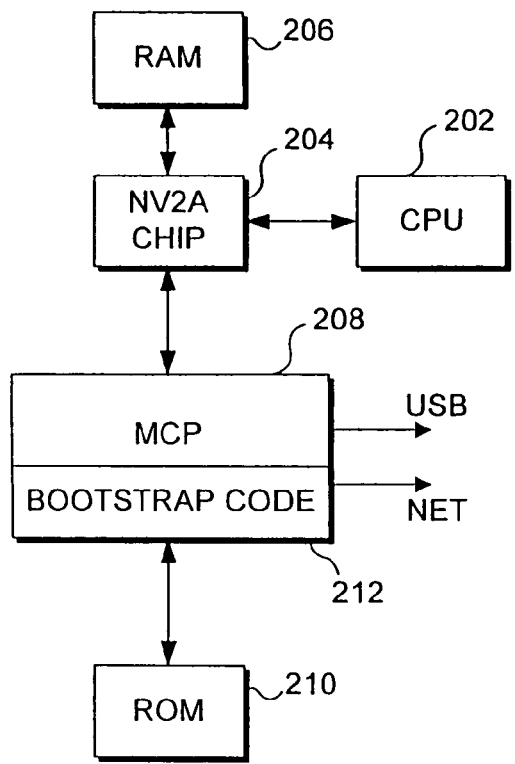
FIG. 2A is a block diagram of several functional components included in the game console of FIG. 1.

FIG. 2A illustrates several of the IC components that are included within game console 100. A CPU 202 is the main processor and is used for carrying out a majority of the processing functions of the game console. CPU 202 must initially be booted-up, as is common for most processors, to enable it to carry out various functions which the game console is designed to implement. CPU 202 is bi-directionally connected to a customized graphic processor that is also a bus and memory controller chip 204 produced by NVIDIA Corporation and designated as the NV2A chip. The NV2A chip is connected to RAM 206 and to another NVIDIA custom-made chip that is a media communications processor (MCP) 208, which provides audio signal processor capability, couples to system memory, and also couples to the USB port and Ethernet port for data communication. Included within MCP 208 are 512 bytes of firmware comprising a bootstrap code 212. Bootstrap code 212 is substantially buried under other layers within MCP 208 and is not accessible simply by decapping this module. In order to physically access bootstrap code 212, it would be necessary to remove other overlying layers, which would effectively destroy the MCP module, making it and the game console unusable. Furthermore, since MCP 208 is custom-made for the manufacturer of the game console, it is not available to others on the open market. Even if the bootstrap code is accessed in some manner to make the machine instructions comprising this firmware "visible," the present invention makes the boot sequence unalterable. MCP 208 couples to a ROM 210, which includes most of the machine instructions that are used during the boot-up of game console 100.

Figure 2B:
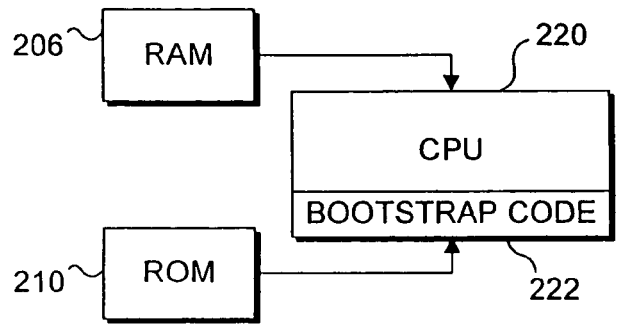
FIG. 2B is a functional block diagram of a general electronic device that boots-up and includes a processor and memory.

A more general application of the present invention is shown in regard to the components in FIG. 2B. It is contemplated that a custom CPU 220 could include firmware bootstrap code 222 "buried" within it, below other layers of the CPU. As shown in FIG. 2B, CPU 220 is coupled to RAM 206 and ROM 210. Since bootstrap code 222 comprises firmware within CPU 220, signals between the processing portion of the CPU and bootstrap code 222 would be generally inaccessible. Accordingly, for the embodiment shown in FIG. 2B, it would be even more difficult to access bootstrap code 222 and determine its content, and thus, the embodiment of FIG. 2B provides a further increase in security, relative to the embodiment of FIG. 2A.

Figure 3:
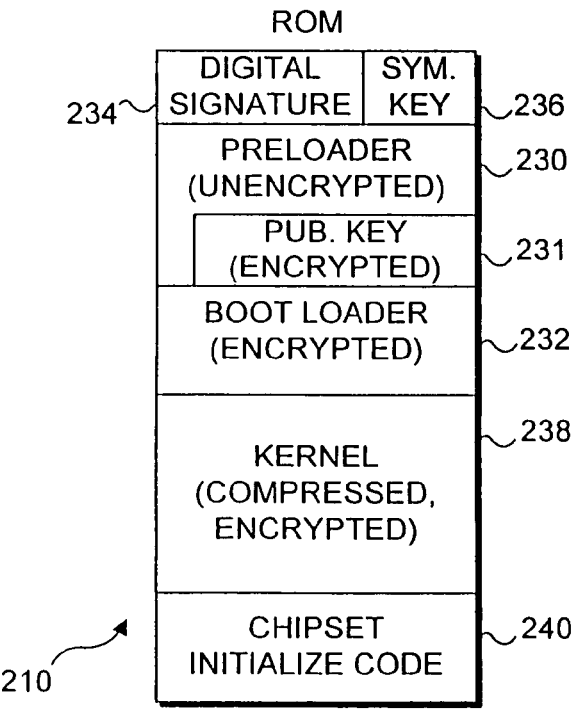
FIG. 3 is a schematic diagram illustrating portions of a memory as configured in the present invention.

FIG. 3 illustrates different portions of ROM 210 that are used in the present invention. In the preferred embodiment used in game console 100, ROM 210 comprises a 256 kilobyte memory module. Included within ROM 210 is a preloader 230, which is not encrypted. Preloader 230 has fixed size of approximately 11 kilobytes in the preferred embodiment, and its content, size, and location within ROM 210 are all predefined. It is important to note that preloader 230 includes an encrypted public key 231. Also important is the need to maintain the content of preloader 230 unchanged, unless a corresponding change is made to firmware bootstrap code 212, as will be evident from the following explanation. ROM 210 also includes a boot loader 232, which is encrypted. In addition, ROM 210 includes a digital signature 234 and a symmetric key 236. By far the greater portion of ROM 210 is devoted to storing machine instructions comprising a kernel 238. Kernel 238 is both compressed and encrypted. The machine instructions included within kernel 238 define much of the functionality and establish the policies relating to the operation of game console 100. Finally, a chipset initialize code 240 is included and is executed when initially powering up the game console.

Figure 4:
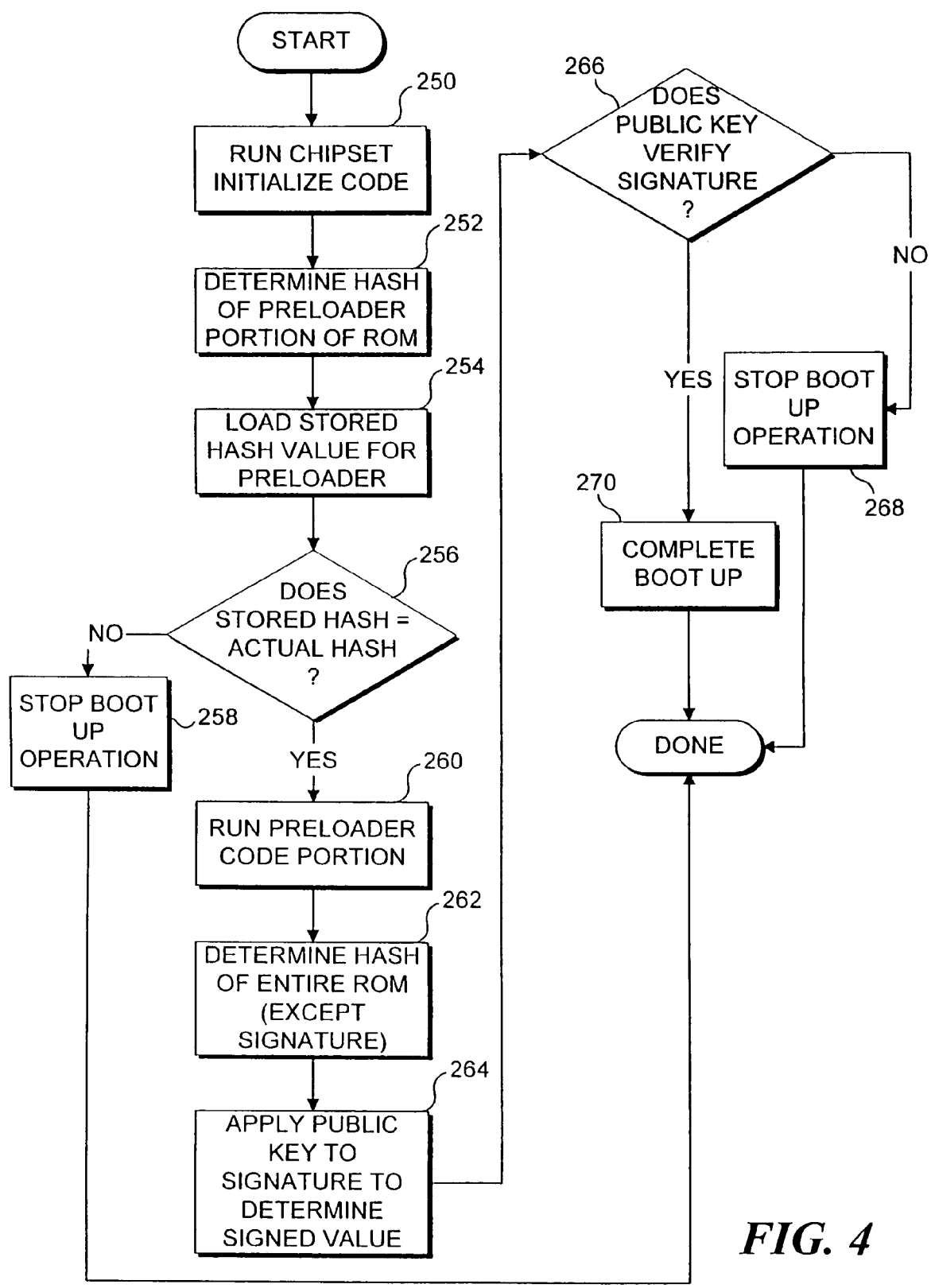
FIG. 4 is a flow chart illustrating the logic implemented in the present invention.

FIG. 4 illustrates the logical steps that are implemented when game console 102 is initially energized or is reset. A step 250 provides for running the chipset initialize code in ROM 210. The machine instructions included within chipset initialize code 240 are not encrypted; they define the specific configuration information and the specific configuration sequence that is appropriate for the architecture of the complete game console. The machine code necessary to perform the chipset configuration is included in bootstrap code; the specific values and sequence are part of the chipset initialize code. Also, the initialization sequence for the CPU is contained in the bootstrap code and is executed prior to the remainder of chipset initialize code. Next, in a block 252, the machine instructions included within firmware bootstrap code 212, which is buried within MCP 208, runs a one-way hashing algorithm to determine a hash value for preloader 230 in ROM 210. As noted above, in the original ROM 210 that was installed within game console 100 when it was manufactured, preloader 230 will have a specific content, size, and location within ROM 210. Accordingly, the hash value obtained by hashing the machine instructions included within preloader 230 should always remain the same, so long as preloader 230 has not been altered or replaced with unauthorized code. In the preferred embodiment, an SHA-1 one-way hash algorithm is applied to hash the preloader. Alternatively, an MD5 hashing algorithm could instead be employed, and those of ordinary skill in the art will appreciate that still other hashing algorithms can be used. The hashing algorithm employed is included within the machine instructions of bootstrap code 212.

Also included within bootstrap code 212 is a stored hash value that is the expected hash value for preloader 230, and a symmetric key. A step 254 loads the stored hash value from the bootstrap code. The machine instructions in bootstrap code 212 compare the stored hash value from the bootstrap code to the hash value that was just determined for preloader 230 in step 252. The comparison is made in a decision step 256 to determine if the stored hash value is equal to the actual hash value that was determined. If not, the machine instructions in bootstrap code 212 implement a step 258, which stops the boot-up process of game console 102. Accordingly, it will be apparent that if a different ROM is substituted for the original ROM, and the new substituted or unauthorized ROM does not include an identical preloader portion that will produce the expected hash value when processed with the one-way hash algorithm, decision step 256 will detect the modification to preloader 230 and terminate the boot-up process.

Assuming that the stored expected hash value is equal to the actual hash value that was determined, a step 260 executes the machine instructions comprising the preloader code portion of ROM 210. This step can be implemented, since it will be apparent that the preloader machine instructions are identical to the preloader code originally included in the ROM installed within the game console by its manufacturer.

Next, a step 262 provides for determining a hash value for the entire ROM 210, except digital signature 234. The preloader also includes machine instructions for determining a one-way hash value and again preferably uses either the SHA-1 or the MD5 hashing algorithms (or one of the other well known one-way hashing algorithms) to determine the hash value for most of the contents of ROM 210 (the digital signature is not included among the contents of ROM 210 that are hashed). So long as the same hash algorithm is applied, the result should always be the same unless the machine instructions have been changed, or replaced with unauthorized machine instructions. Changing even a single bit of the machine instructions that are hashed in ROM 210 will substantially change the resulting hash value.

Public key 231 in ROM 210 is applied to digital signature 234, in a step 264 to produce a corresponding value for the digital signature. (Before the public key can be applied, it is decrypted with the symmetric key stored in the bootstrap code of the MCP, but this step is not required if the public key is not encrypted with this symmetric key.) Next, the machine instructions in preloader 230 determine if the public key is able to verify the signature in a decision step 266 in FIG. 4; this step determines if the value from step 264 equals the hash value for the ROM determined in step 262. If not, a step 268 stops the boot-up operation since it will be apparent that the signature in ROM$_{II}$ has been changed since the original content of the ROM was created. As is well known, if the signature value was originally signed using a private key known only to the manufacturer of the game console, the validity of the signature can be confirmed using a public key. If someone hacks game console 100 and attempts to modify any portion of ROM 210, the change in the hash value will be detected at decision step 266, causing the boot-up process to be terminated in step 268. Conversely, if the digital signature matches the hash of the ROM, it will be apparent that the ROM content is identical to the original content that is authorized.

Assuming that the value determined from the digital signature in step 264 verifies the hash of the ROM in decision step 266, a step 270 enables the boot-up to go to completion, enabling kernel 238 to be copied into RAM 206 and then decompressed and unencrypted into the RAM. Preloader 230 includes machine instructions for decrypting the boot loader. The symmetric key in the firmware bootstrap code maintained in the MCP is combined with symmetric key 236 in ROM 210 to produce a new symmetric code that is used for decrypting the boot loader in accord with the machine instructions in the preloader.

The boot loader includes machine instructions for implementing a stream cipher decryption of the compressed and encrypted kernel, in accordance with the RC4 stream cipher algorithm, as is well known to those of ordinary skill in the art. The machine instructions comprising the kernel that have been decompressed and decrypted into RAM 206 can then be executed by CPU 202 to carry out the full functionality of the game console, ensuring, e.g., that it loads only authorized game software, executes an algorithm that discourages copying of video DVDs, and ensures that it carries out all other policies and functions desired by the manufacturer of the game console, as defined by the authorized boot-up code.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for determining whether code provided for execution during a boot-up of an electronic device is authorized, said method comprising the steps of:
   (a) hashing a predefined portion of the code to produce a first hash value, the code being stored in non-volatile memory, and the code including at least:
      a digital signature;
      at least two keys;
      a boot loader; and
      an initialization code configured to be executed when initially powering up the electronic device;
   (b) comparing the first hash value to a stored hash value that is maintained in a circuit component of the electronic device, the circuit component being stored on the electronic device and separate from the non-volatile memory where the code is stored and being configured to perform at least one function of the electronic device other than data storage and boot-up security, to verify that the predefined portion of the code is authorized;
   (c) when the first hash value equals the stored hash value, executing the predefined portion of the code, and when the first hash value does not equal the stored hash value, terminating the boot-up of the electronic device;
   (d) wherein executing said predefined portion of the code that was hashed to produce the first hash value carries out the steps of:
      (i) hashing substantially all of the code to determine a second hash value, the hashing of substantially all of the code being based on a hashing algorithm as defined in the predefined portion of code, such that the hashing algorithm is defined in the predefined portion of code that was previously hashed to produce the first hash value, and wherein hashing substantially all of the code includes hashing the predefined portion of the code, the boot loader, the initialization code, and at least two keys, while abstaining from hashing the digital signature included in the code; and
      (ii) verifying whether the digital signature that is included in the code matches the second hash value of substantially all of the code, and when the digital signature matches the second hash value, enabling execution of the code, and when the digital signature does not match the second hash value, terminating the boot-up of the electronic device.

2. The method of claim 1, wherein the step of comparing the first value to the stored hash value comprises the step of executing an initial code that is maintained in a non-volatile storage portion of the circuit component, said initial code including the stored hash value.

3. The method of claim 2, wherein the initial code is maintained in the non- volatile storage portion of an auxiliary processor.

4. The method of claim 2, wherein the initial code is maintained in the non-volatile storage portion of one of:
   (a) a graphic processor;
   (b) an audio processor;
   (c) an input processor;
   (d) an output processor;
   (e) a communication processor; and
   (f) a digital signal processor.

5. The method of claim 2, wherein the initial code is maintained in the non-volatile storage portion of a processor that executes the initial code.

6. The method of claim 2, wherein the initial code is permanently defined in firmware as a predetermined number of bytes.

7. The method of claim 1, wherein the predefined portion of the code comprises preloader code having a predetermined number of bytes disposed at a predetermined location within the code.

8. An electronic device that must be booted-up to operate, comprising:
   (a) a non-volatile memory in which a plurality of machine instructions are stored, said non-volatile memory including a main portion, and a preloader portion that is predefined in regard to a content, a size, and a location, and further including:
      a digital signature;
      at least two keys;
      a boot loader; and
      an initialization code configured to be executed when initially powering up the electronic device;
   (b) a processor that is coupled to the non-volatile memory to execute the machine instructions; and
   (c) a bootstrap code firmware element stored in a circuit component separate from the non-volatile memory and configured to perform at least one function other than data storage and boot-up security, the bootstrap code firmware element specifying machine instructions defining a hashing algorithm and an expected hash value, the machine instructions of said bootstrap code firmware being executed by the processor initially during a boot-up of the electronic device, causing the processor to:
      (i) hash the preloader portion of the non-volatile memory to determine a preloader hash value;
      (ii) compare the expected hash value stored in the firmware element to the preloader hash value;
      (iii) terminate the boot-up of the electronic device when the preloader hash value does not equal the expected hash value; and
      (iv) when the preloader hash value equals the expected hash value, execute a subsequent hashing algorithm defined in the preloader portion that was previously hashed to determine a second hash value, by at least hashing the preloader portion, the at least two keys, the boot loader, and the initialization code, while abstaining from hashing the digital signature.

9. The electronic device of claim 8, wherein the preloader portion of the non-volatile memory includes machine instructions that cause the processor to:
   (a) hash the non-volatile memory, producing a memory hash value;
   (b) compare the memory hash value to an expected memory hash value that is included in the preloader portion; and
   (c) terminate the boot-up of the electronic device if the memory hash value does not equal the expected memory hash value.

10. The electronic device of claim 9, wherein the expected memory hash value is included as a digital signature within the non-volatile memory, but is excluded when the non-volatile memory is hashed.

11. The electronic device of claim 8, wherein at least a part of the main portion of the non-volatile memory is encrypted, and wherein the preloader portion of the non-volatile memory includes machine instructions that cause the processor to decrypt said at least the part of the main portion of the non-volatile memory that is encrypted, enabling the boot-up of the electronic device to continue with machine instructions that are included in the main portion of the non-volatile memory.

12. The electronic device of claim 8, wherein the bootstrap code firmware element is disposed within an other component of the electronic device and is substantially physically inaccessible without damaging the other component sufficiently to cause the electronic device to become inoperable.

13. The electronic device of claim 8, wherein the other component comprises an auxiliary processor including one of:
    (a) a graphic processor;
    (b) an audio processor;
    (c) an input processor;
    (d) an output processor;
    (e) a communication processor; and
    (f) a digital signal processor.

14. The electronic device of claim 8, wherein the bootstrap code firmware element in disposed within the processor.

15. The electronic device of claim 8, wherein at least a part of the main portion of the non-volatile memory is encrypted, and wherein the preloader portion of the non-volatile memory includes:
    (a) machine instructions that define a one-way hashing algorithm;
    (b) machine instructions for decoding said at least the part of the main portion of the non-volatile memory;
    (c) machine instructions comprising a boot loader; and
    (d) at least one public key.

16. The electronic device of claim 8, wherein the electronic device comprises a game console.

17. The electronic device of claim 8, wherein:
    the electronic device is a game console; said processor is bi-directionally coupled to a customized graphic processor that is also a bus and memory controller, and which is connected to RAM and to said circuit component, said second component being a chip that is a media communications processor which is custom-made for a manufacturer of the game console and provides audio signal processor capability and couples to system memory, and a USB port and Ethernet port of the game console;
    said bootstrap code is included within 512 bytes of firmware within said custom-made chip, and is buried under other layers to require removal of overlying layers to physically access said bootstrap code;
    said non-volatile memory is a ROM having a 256 kilobyte memory module, said main portion is an encrypted and compressed kernel defining functionality and policies relating to operation of the game console, and wherein the at least two keys include a symmetric key and an encrypted public key;
    the boot loader is an encrypted boot loader; and
    the initialization code is a chipset initialization code; and
    causing the processor to execute the hashing function defined in the preloader portion that was hashed to determine the preloader hash value includes causing the processor to further hash while continuing to abstain from hashing the digital signature.

* * * * *